United States Patent
Raad

(10) Patent No.: US 7,379,112 B1
(45) Date of Patent: May 27, 2008

(54) QUICK CHANGE LENS MOUNT

(75) Inventor: Elie-Jean J. Raad, New Westminster (CA)

(73) Assignee: Honeywell Silent Witness Inc., Surrey, British Columbia (CA)

( * ) Notice: Subject to any disclaimer, the term of this patent is extended or adjusted under 35 U.S.C. 154(b) by 1045 days.

(21) Appl. No.: 09/386,506

(22) Filed: Aug. 31, 1999

(51) Int. Cl.
*H04N 5/225* (2006.01)

(52) U.S. Cl. .................................. 348/340; 348/374

(58) Field of Classification Search ............ 348/340, 348/374, 335; 359/827, 829
See application file for complete search history.

(56) References Cited

U.S. PATENT DOCUMENTS

| | | | | |
|---|---|---|---|---|
| 3,529,525 A | * | 9/1970 | Yamashita | 396/533 |
| 3,559,542 A | * | 2/1971 | Clapp | 396/530 |
| 4,104,649 A | * | 8/1978 | Tanaka et al. | 396/297 |
| 4,281,895 A | * | 8/1981 | Mohr | 359/827 |
| 5,455,711 A | * | 10/1995 | Palmer | 359/353 |
| D408,833 S | * | 4/1999 | Irie | D16/203 |
| 6,011,661 A | * | 1/2000 | Weng | 359/819 |

FOREIGN PATENT DOCUMENTS

| | | | |
|---|---|---|---|
| JP | 09021938 A | * | 1/1997 |
| JP | 10073864 A | * | 3/1998 |
| JP | 2000138853 A | * | 5/2000 |

* cited by examiner

*Primary Examiner*—James M. Hannett
(74) *Attorney, Agent, or Firm*—Scully, Scott, Murphy & Presser, P.C.

(57) ABSTRACT

A quick change lens mount for connecting a lens assembly to a camera board, the camera board having a image recording device, a filter and a filter frame to position the filter over the image recording device. The lens mount includes a base attached to the camera board and a quick connect coupling on the base for removable coupling to said lens assembly. The base, filter and filter frame are all affixed to the camera board by fasteners.

7 Claims, 3 Drawing Sheets

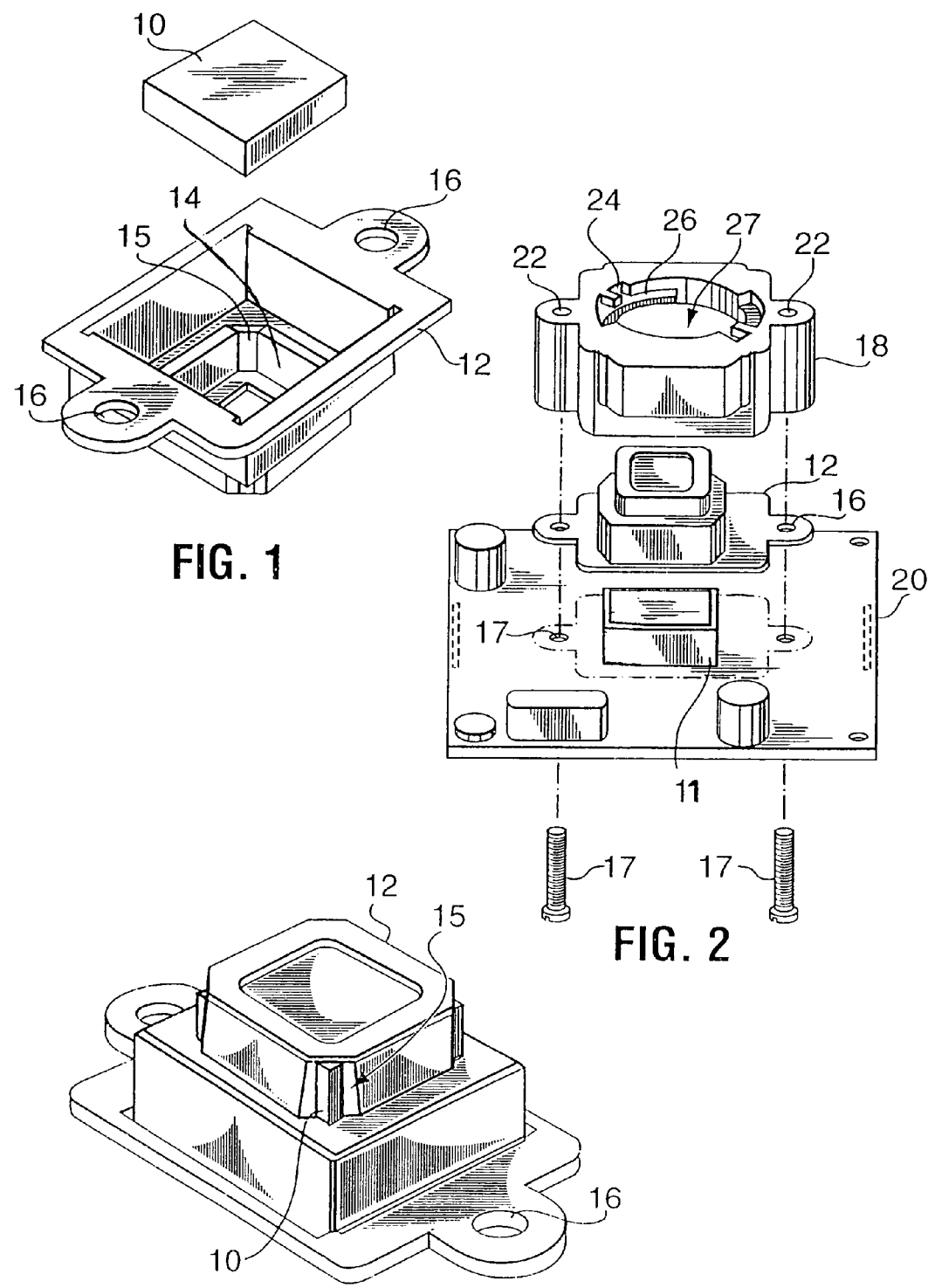

QUICK CHANGE LENS MOUNT

FIELD

The present invention relates to a quick connect and disconnect lens mount for light and image sensors such as Complimentary Metal Oxide Semiconductor (CMOS) and charged coupled (CCD) devices or other similar devices.

BACKGROUND

In systems that have a camera board to which a light and image sensor device is mounted, a base that encloses the device and a lens which directs external light from an image to the device, it often is desirable to change lenses in order to improve the image. For lenses with threads it is necessary to screw in and unscrew the lens for each lens change required. Moreover, different lenses often have different thread sizes so that not only is it necessary to screw and unscrew the lenses but a different base must be mounted having threads which mate with the threads of the new lens.

Accordingly, it is an object of the invention to provide an improved lens mount which permits a more rapid change of lenses.

It is a further object of the invention to provide an adapter which couples a lense having one thread size to a base having a different thread size.

SUMMARY OF THE INVENTION

According to the invention there is provided a quick change lens mount for connecting a lens assembly to a camera board, the camera board having a image recording device, a filter and a filter frame to position the filter over the image recording device. The lens mount includes a base attached to the camera board and a quick connect coupling on the base for removable coupling to said lens assembly. The base, filter and filter frame are all affixed to the camera board by fasteners.

The base may have an interior opening and the quick connect coupling comprises a set of slots to permit passage of a key affixed to an end of the lens assembly and a set of keyways extending circumferentially from ends of corresponding ones of the slots. The slots and keyways may be dimensioned to receive keys of the lens assembly so as to lock the lens assembly to the base upon engagement of the keys of the lens assembly to respective keyways on the base.

The lens assembly may have a removable adapter having a threaded interior opening to receive a threaded end of a lens housing and a base insert end, said base insert end having keys for engagement with the keyways.

An end of the lens assembly may have a cylindrical surface with a set of keys affixed thereto on diametrically opposite sides of the cylindrical surface.

In another aspect of the invention there is provided a method of mounting a lens assembly to a camera board which includes forming a base to fit over and lock to an end of the lens assembly, mounting the base over an image recording device and affixed to the camera board, and inserting and locking the lens assembly to the base.

BRIEF DESCRIPTION OF THE DRAWINGS

Further features and advantages will be apparent from the following detailed description, given by way of example, of a preferred embodiment taken in conjunction with the accompanying drawings, wherein:

FIG. 1 is a perspective exploded view of the filter and filter housing;

FIG. 2 is a perspective exploded view of the base, filter housing, filter and camera board;

FIG. 3 is a perspective view of the filter holder with filter mounted in an undercut filter cavity in the filter holder;

DETAILED DESCRIPTION WITH REFERENCE TO THE DRAWINGS

Figure 4:
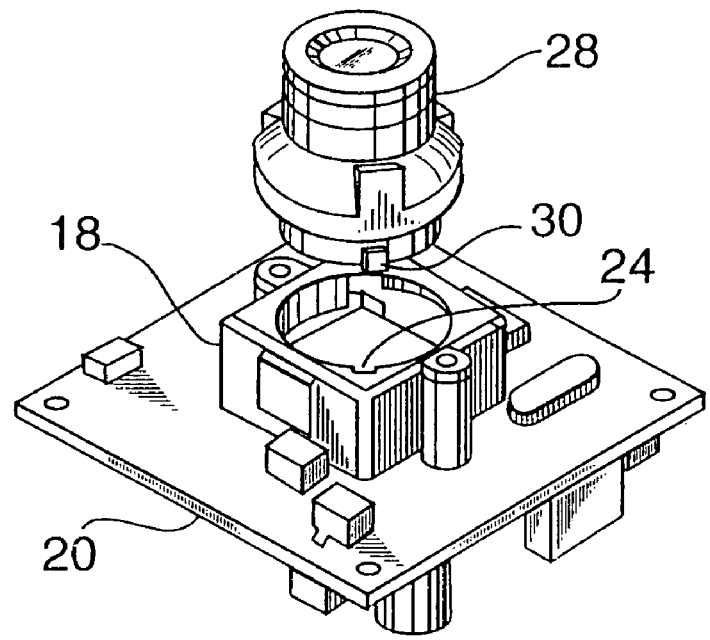
FIG. 4 is a perspective view of a lens above a base which has been fastened to the camera board.

Referring to FIG. 1 a filter 10 of rectangular cross section is positioned over a charge coupled device 11 and fits into a rectangular recess 14 of a filter frame 12. As seen in FIG. 2, the filter 10 is positioned atop a camera printed circuit board 20 and the filter frame 12 covers the filter 10. The filter frame 12 has two screw holes 16 which align with corresponding screw holes 17 in the camera board 20. A base 18 having a cylindrical opening 27 and two threaded holes 22 is fitted over the filter frame 12 with threaded holes 22 aligned with screw holes 16. Screws 17 pass through screw holes 16 and register with threaded holes 22. Base 18 has opposing slots 24 and keyways 26 on its interior cylindrical surface.

Referring to FIG. 3 the filter frame 12 is shown engaging the filter 10. The corners 15 of the filter frame 12 are undercut so that the corners of the filter 10 extend through. By making the filter frame 12 of an elastomeric material they can tightly engage the sides of the filter 10 and serve to shield it from the effects of impact.

Figure 5:
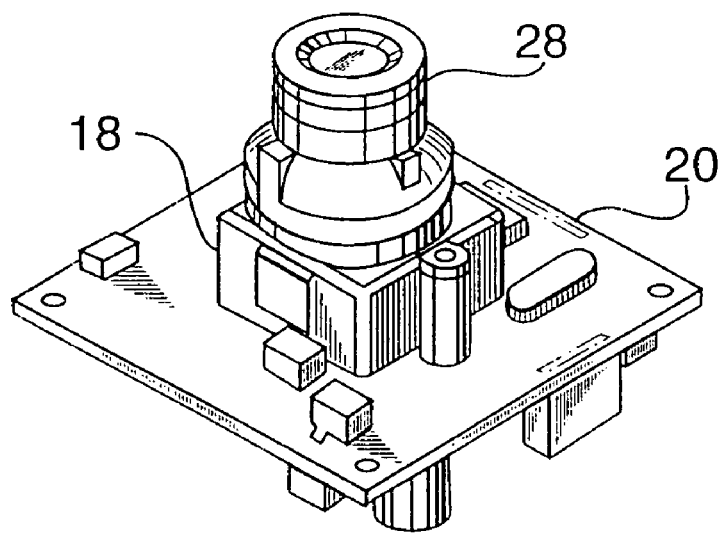
FIG. 5 is a perspective view of the lens mounted in the base atop the camera board.

Referring to FIG. 4 a lens assembly 28 of generally cylindrical shape has a pair of opposed keys 30 dimensioned to slidably pass through slots 24 and engage keyways 26 so as to lock the lens assembly 28 to the base 18. The lens assembly 28 is shown in FIG. 5 in its locked position ready to record images electronically.

In operation image light passes through the lens of lens assembly 28 and through filter 10 is focused onto charged coupled device 11 which records the image in electronic form. The video data is stored on another board. Each time a new lens is required the lens assembly 28 mounted on the camera board 20 is simply rotated and withdrawn from base 18 and a new lens assembly is inserted.

Figure 6:
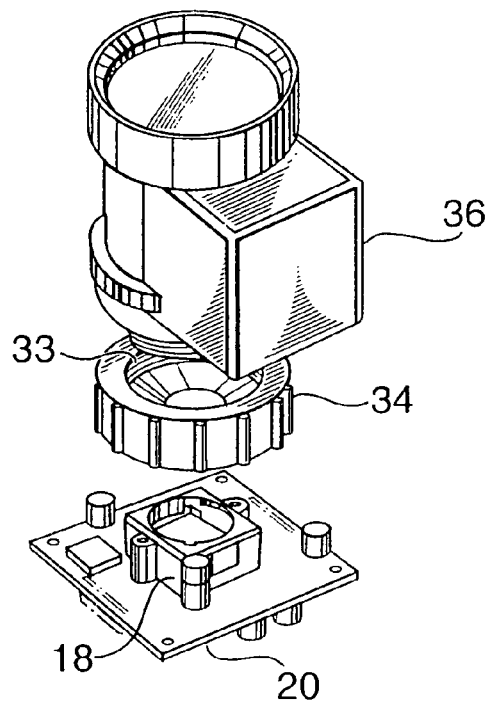
FIG. 6 is a perspective exploded view of the lens assembly having a threaded end, an adapter and the base mounted on the camera board.
Figure 7:
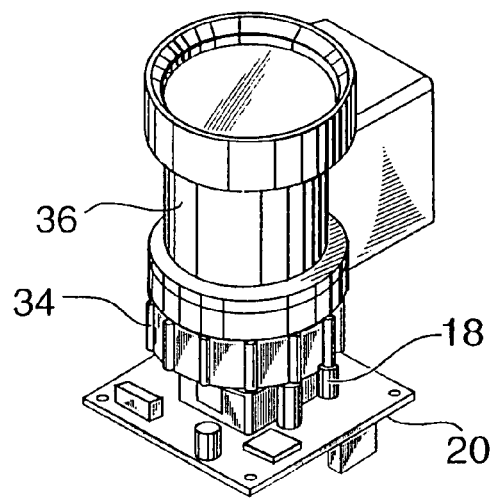
FIG. 7 is a perspective view of the lens assembly mounted to the adapter and the adapter mounted to the base atop the camera board.
Figure 8:
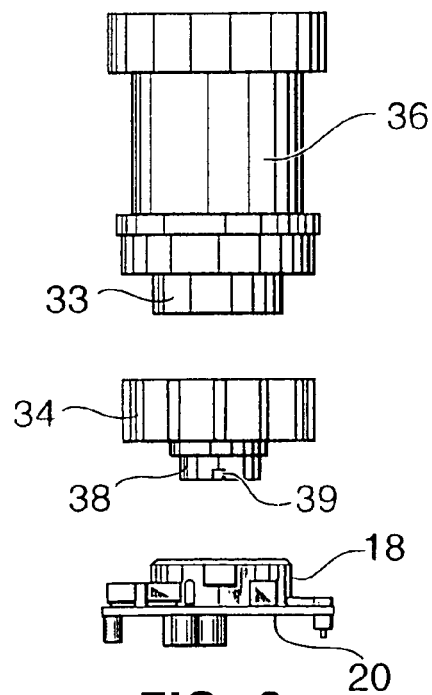
FIG. 8 is an exploded elevation view of the lens assembly, the adapter and the base mounted on the camera board.

An alternative mounting scheme is shown in FIGS. 6, 7 and 8 for a lens assembly having a threaded end 33 rather than the keys 30 shown by the lens assembly 28. In this case the adapter 34 has an interior threaded opening which registers with threads 33. As seen in FIG. 8 adapter 34 has an end 38 with a key 39 on diametrically opposite sides of end 38. Keys 39 on end 38 engage keyways 26 in base 18 in the same was as lens assembly 28 described above.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

The invention claimed is:

1. A quick change lens mount for connecting a lens assembly to a camera board, the camera board having an image recording device, a filter and a filter housing to position the filter over the image recording device, comprising:
   (a) a base attached to said camera board, having a quick connect coupling for removable coupling to said lens assembly said base having an interior opening and said quick connect coupling having a pair of slots to permit passage of a key and a pair of keyways extending circumferentially from ends of corresponding ones of said slots;
   (b) a removable adapter coupled to said lens assembly, said removable adapter having a threaded interior opening to receive a threaded end of a lens housing and a base insert end, said base insert end having keys for engagement with said keyways on said base so as to lock said lens assembly to said base upon engagement of the keys of said removable adapter to respective ones of said keyways on said base, and;
   (c) means for affixing said base, filter and filter frame to said camera board, and said filter housing is rectangular and has undercuts at respective corners such that corners of said filter extend through corresponding ones of the undercuts of said filter housing such that said filter housing tightly grips said filter.

2. A mount according to claim 1, wherein said base insert end of said removable coupling has a cylindrical surface with a pair of keys affixed thereto on diametrically opposite sides of said cylindrical surface.

3. A mount according to claim 1, wherein said means for affixing is a pair of screws passing through holes in said camera board and filter frame and engaging threaded holes in said base.

4. A mount according to claim 3, wherein said filter housing is elastomeric.

5. A mount according to claim 1, wherein said filter housing is resilient so as to shield said filter from impact.

6. A method of mounting a lens assembly to a camera board, comprising:
   (a) attaching a removable adapter to said lens assembly, said adapter having a threaded opening with threads that mate with threads on said lens assembly and a pair of keys at an end thereof opposite to said threaded opening;
   (b) forming a base to lock to an end of said removable adapter, said base having an opening with slots and keyways on an interior surface thereof which slidably receive and engage said keys on said removable adapter;
   (c) mounting said base over an image recording device and affixed to said camera board wherein said image recording device includes a filter and said base includes a filter housing to shield said filter by forming said filter housing with a resilient material, and
   said filter housing is rectangular with its corners undercut so as to permit firm engagement of sides of said filter by sides of said filter housing; and
   (d) inserting and locking said lens assembly to said base.

7. A method according to claim 6, wherein said filter housing is elastomeric.

* * * * *